A. M. DEMUTH.
COOKER.
APPLICATION FILED JUNE 24, 1916. RENEWED JULY 12, 1917.
1,258,994.
Patented Mar. 12, 1918.
2 SHEETS—SHEET 1.
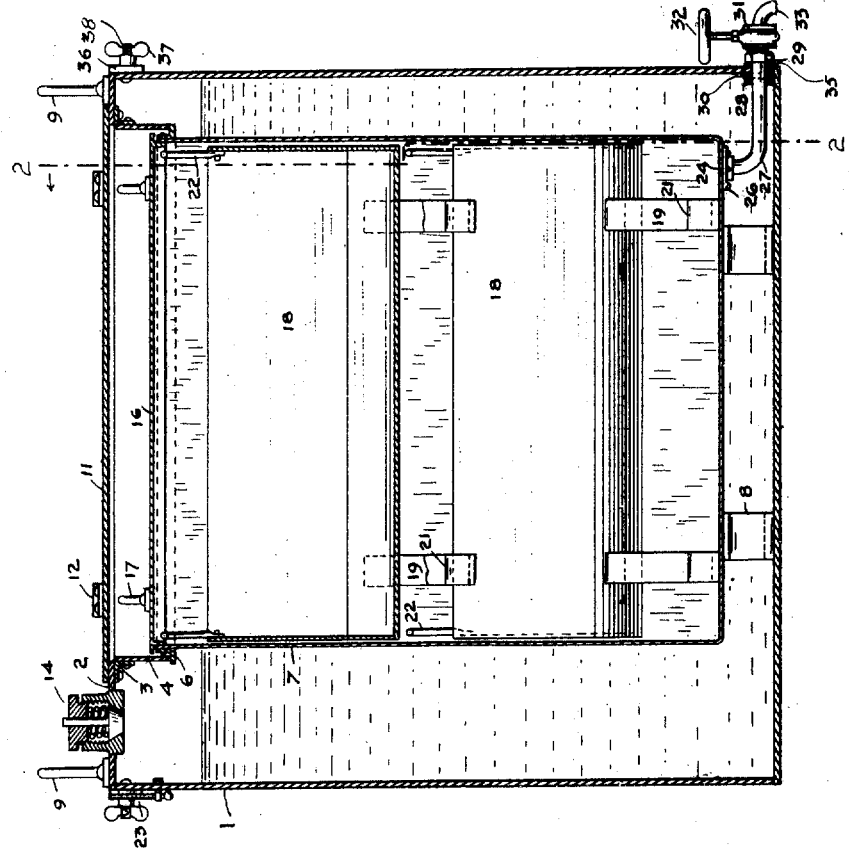
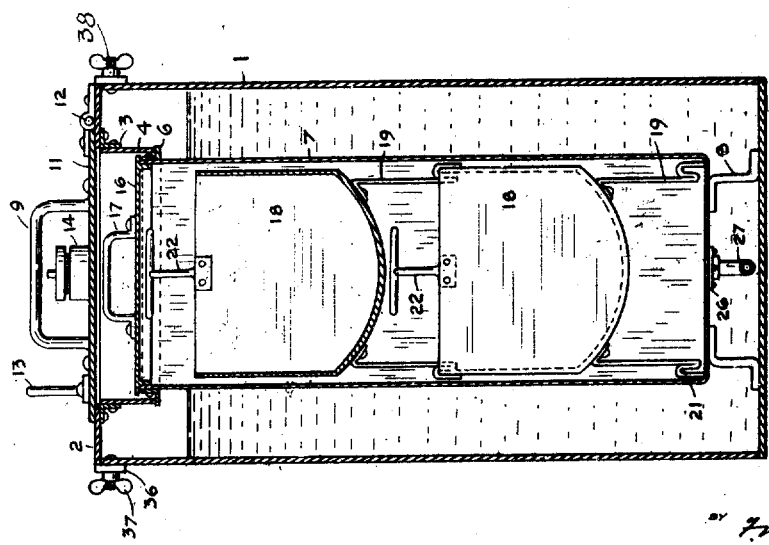
INVENTOR
A. M. DEMUTH
BY F. M. Wright
ATTY.

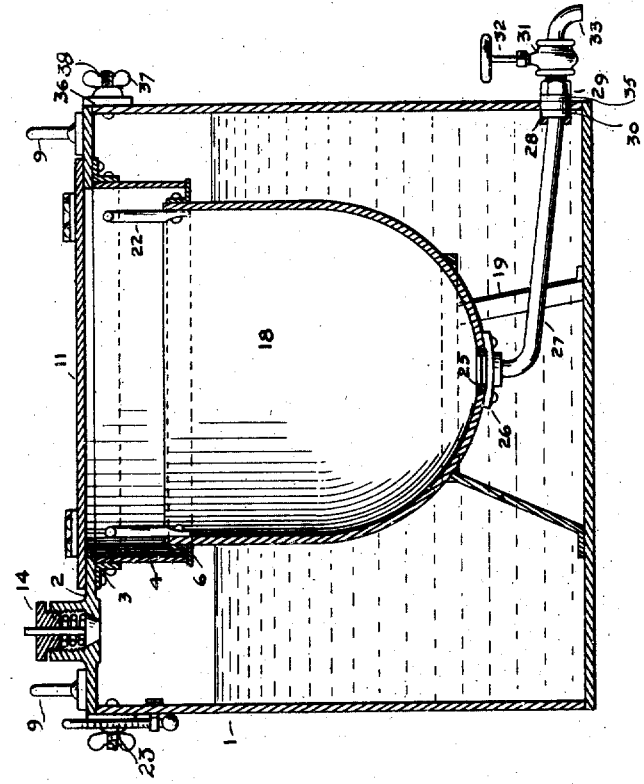
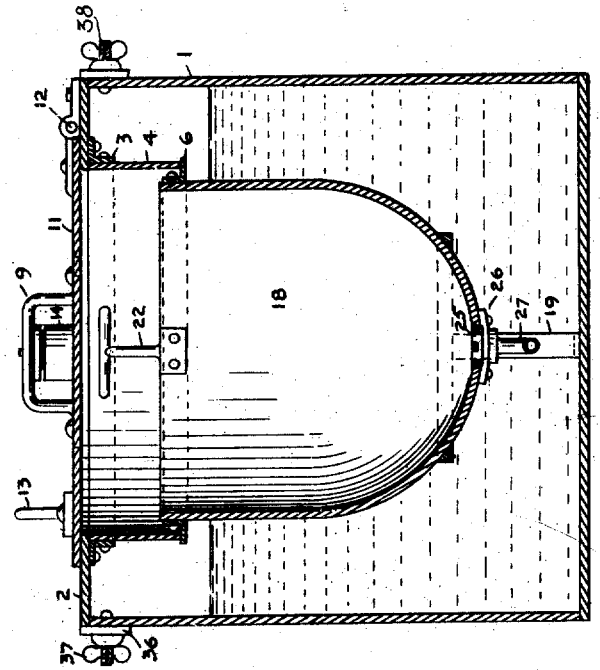

UNITED STATES PATENT OFFICE.

ALFRED M. DEMUTH, OF SAN FRANCISCO, CALIFORNIA.

COOKER.

1,258,994.  Specification of Letters Patent.  Patented Mar. 12, 1918.

Application filed June 24, 1916, Serial No. 105,712. Renewed July 12, 1917. Serial No. 180,239.

*To all whom it may concern:*

Be it known that I, ALFRED M. DEMUTH, a citizen of the United States, residing at San Francisco, in the county of San Francisco and State of California, have invented new and useful Improvements in Cookers, of which the following is a specification.

The present invention relates to improvements in apparatus for cooking food in its own juices and without immersing the same in water, and the object of the invention is to provide an apparatus of this character in which a vertical series of vessels can be employed in the same boiler and in which the vessels can be easily and quickly removed and replaced without danger of injury to the operator by the heat required for cooking.

In the accompanying drawing, Figure 1 is a longitudinal section of my improved cooking apparatus; Fig. 2 is a cross section of the same on the line 2—2 of Fig. 1; Fig. 3 is a longitudinal vertical section of a modified form of the invention; Fig. 4 is a cross section of the same.

Referring to the drawing, 1 indicates a boiler, here shown as rectangular in cross section. In the top 2 of the boiler is a rectangular opening, and to the edges of the top around the opening are secured, by angle irons 3, depending plates or walls 4, which hold down an angle iron 6 secured to the outer surface of the top of a rectangular cooker 7, said cooker being supported by lugs 8 secured to its bottom and resting upon the bottom of the boiler. Handles 9 are provided at the ends of the top of the boiler, and a cover 11, hinged, as shown at 12, closes the opening in its top, said cover having near its free edge a handle 13. In the top of the boiler is a safety valve 14. The cooker is closed at the top by a cover 16, handles 17 being provided for lifting the cover from the cooker.

In the cooker is a vertical series of cooking vessels 18, all interchangeable with each other (two only being here shown), each cooking vessel having flat sides and a rounded bottom and having legs 19 secured to, and depending from, its bottom, and bent, as shown at 21, so as to be capable of resting upon the upper edge of the next lower cooking vessel of the series as well as being able to rest upon the bottom of the cooker. At the ends of each cooking vessel are secured T-shaped handles 22. A thermometer 23 serves to indicate the temperature. To the bottom of the cooker, around a hole 24 therein, is riveted a plate 26 in which is secured a pipe 27 extending through a hole in a side of the boiler near the bottom, having a collar 28 secured to the pipe against a gasket 30 inside the boiler, and a nut 29 screwed on the pipe against a gasket 35 outside the boiler. To the end of said pipe is secured a valve casing 31 having a valve 32 therein and discharging into a spout 33.

A plug 25 in the hole in the bottom of the cooking vessel can be removed and the faucet opened when it is desired to draw off the liquid contents thereof.

The form of the invention shown in Figs. 3 and 4 is best adapted for cooking vegetables, the cooker being round, instead of rectangular, and therefore having no corners in its interior. I have herein shown the cooker used as a cooking vessel.

By reason of the walls 4 contacting at their lower edges with the angle plates 6, no steam can pass from the boiler to injure the person of the attendant, and furthermore, the walls 4 and angle irons 6 prevent the steam or vapor from the boiler 1 from entering the vessel 18, so that the food in the vessel will be cooked in its own juice.

By means of the above-described invention, all kinds of meats, vegetables, and fruits, can be cooked in their own juices and without the admixture of water, the resulting product being found to be very superior to these edibles as ordinarily cooked by mixing with water, as they retain the original flavor in a very high degree.

When it is desired to remove the cooker from the boiler, the boiler cover can be removed by unscrewing thumb nuts 37 on screws 38 which extend through lugs 36 depending from said boiler cover and thus attach it to the boiler.

The arrangement of the pipe leading to the faucet in the bottom of the cooker permits of the cooker being thoroughly cleansed. The faucet can also be removed from said pipe and itself cleansed.

I claim:—

1. In a combination, a boiler, a top therefor having an opening therein and a wall depending therefrom around said opening, a cooker in said boiler, its top extending above the bottom of said wall but below the top of the boiler, said cooker being provided with means extending beneath, and into close contact with, said wall, for preventing the passage of steam into the space within the wall and above the cooker.

2. In combination, a boiler, a top therefor having an opening therein and a wall depending therefrom around said opening, a cooker in said boiler, its top extending above the bottom of said wall but below the top of the boiler, and an angle iron secured to, and around the cooker and extending beneath, and into close contact with, said wall to prevent the passage of steam into the space within the wall and above the cooker.

3. In combination, a boiler, a top therefor having an opening therein and a wall depending therefrom around said opening, a cooker in said boiler, its top extending above the bottom of said wall but below the top of the boiler, an angle iron secured to, and around the cooker and extending beneath, and into close contact with, said wall to prevent the passage of steam into the space within the wall and above the cooker, and a vertical series of interchangeable cooking vessels in said cooker.

4. An apparatus of the character described, embodying a boiler having an entrance opening in the top thereof, an open cooker in the boiler, a closure for the said entrance opening of the boiler, and a closure for the space between the top of the boiler and the top of the cooker to prevent entrance of steam into said space from the boiler, the last said closure embodying means disposed between the cooker and the boiler and encompassing the upper portion of the cooker, a portion of the said means being supported by the cooker, and another portion being supported by the boiler.

5. An apparatus of the character described, embodying a boiler having an entrance opening in its top, a wall encompassing said opening and projecting into the boiler, an open cooker in the boiler, the top of said cooker terminating short of the top of the boiler and telescoping with the said projecting wall, interengaging means between the cooker and the said wall to form a closure between the wall and cooker for preventing the passage of steam from the boiler into the space within the wall and above the cooker, and a closure for the said entrance opening of the boiler.

6. An apparatus of the character described embodying a boiler having an opening in the top thereof and a projecting wall around said opening, a cooker in said boiler, the top of the cooker extending above the bottom of said wall but below the top of the boiler, and interengaging means between the cooker and the adjacent edge of the said wall, and forming with the said wall a closure for preventing the passage of steam into the space within the wall and above the cooker.

7. An apparatus of the character described embodying a boiler, a cooker therein, a top therefor, the cooker having an angle iron secured thereto near its top, and a top for the boiler having an aperture and a flange depending therefrom around the aperture, said flange being located to rest upon and coöperate with said angle iron to prevent the entrance of steam from the boiler into the space between the boiler and the top of the cooker.

8. An apparatus of the character described, embodying a boiler, a cooker therein, a top for the boiler having an aperture and a flange projecting therefrom around the aperture, said flange encompassing the top of the cooker and projecting below the top edge thereof, and means connected with the cooker, exterior thereof adjacent the top of the cooker, and adapted to coöperate with the said flange to prevent entrance of steam into the cooker from the boiler.

9. An apparatus of the character described embodying a boiler, a cooker therein, a top for the boiler having an aperture and a flange projecting therefrom around the aperture, said flange encompassing the top of the cooker and projecting below the top edge thereof, and means connected with the cooker, exterior thereof adjacent the top of the cooker, and adapted to coöperate with the said flange to prevent entrance of steam into the cooker from the boiler, the diameter of the top of the cooker being somewhat less than the diameter of the space within the flange.

10. An apparatus of the character described embodying a boiler, a top therefor having an opening therein, a cooker in the boiler, the top of the cooker terminating short of the top of the boiler, means forming a closure to the space between the boiler and cooker and above the latter, to prevent the passage of steam into the space above the cooker, the said means embodying coöperating elements on the boiler and cooker, there being an outlet passage leading from the interior of the cooker and through the boiler, and means exterior of the boiler for controlling said passage.

ALFRED M. DEMUTH.

Copies of this patent may be obtained for five cents each, by addressing the "Commissioner of Patents, Washington, D. C."